(No Model.)
R. KABUS.
Eyeglasses.
No. 234,581.   Patented Nov. 16, 1880.
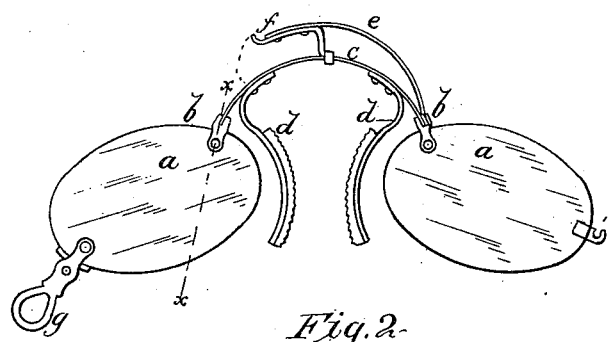
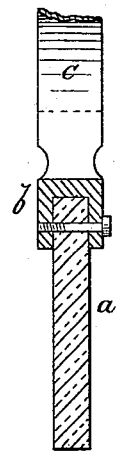 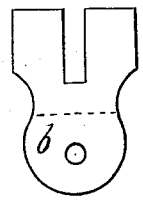
WITNESSES:
Henry N. Miller
C. Sedgwick
INVENTOR:
R. Kabus
BY Munn & Co
ATTORNEYS.

UNITED STATES PATENT OFFICE.

ROBERT KABUS, OF NEW YORK, N. Y.

EYEGLASSES.

SPECIFICATION forming part of Letters Patent No. 234,581, dated November 16, 1880.

Application filed May 17, 1880. (No model.)

*To all whom it may concern:*

Be it known that I, ROBERT KABUS, of the city, county, and State of New York, have invented a new and useful Improvement in Eyeglasses, of which the following is a specification.

The object of my invention is to simplify and cheapen the construction of eyeglasses and to render them more convenient for use.

In the accompanying drawings, forming part of this specification, Figure 1 is a front view of a pair of eyeglasses constructed in accordance with my invention. Fig. 2 is a cross-section, in larger size, on the line $x\ x$ of Fig. 1. Fig. 3 is a side view of one ear-piece.

Similar letters of reference indicate corresponding parts.

$a\ a$ are the lenses, fitted with ears $b$ and connected by the bow-spring $c$. $d\ d$ are the nose-pieces, the same being springs attached by rivets to the bow-spring $c$.

The ear-pieces $b$ are slotted to pass upon the edge of the lenses for attachment by a screw or rivet, in the usual manner, as shown most clearly in Fig. 2, and they are also slotted at their outer ends, at right angles to the slot, for the glass to receive the ends of the bow-spring $c$, which ends are to be secured by soldering. This permits the bow-spring to be formed of a single curved piece, and as the ends do not require bending to adapt them for connection to the ears, steel may be used for the springs. Further, rivets or screws are not required for connection of the springs, so that the labor of tapping the ear-pieces and springs is saved.

The nose-pieces $d$ are separate springs attached to the bow-spring by rivets.

Heretofore in using eyeglasses, in order to open the nose-pieces far enough to permit application to the nose, it has been necessary to stretch the bow-spring by using one hand on each glass. To permit this manipulation by using one hand only I combine with the glasses the spring-lever $e$. This lever is attached by one end to the ear $b$ of one lens by being soldered in a slot in the same manner as the bow-spring $c$, and the other end is attached to a bent finger-piece, $f$, that is attached by a collar to the bow-spring, about midway between the lenses. The piece $f$ extends from its connection to spring $e$ toward the lens $a$, on which the handle $g$ of the glasses is attached, and the spring $e$ is connected with the other lens. The piece $f$ thus constitutes a fulcrum-piece, so that when pressure is applied to press it downward the outer end of lever $e$, with the lens, is raised. The glasses may thus be held with the handle $g$ between the thumb and middle finger of the user, and the forefinger pressing on piece $f$ to throw out the lens and spread the nose-pieces $d$ apart.

This device is simple, convenient, and useful, and it is to be understood that it may be applied to glasses having frames as well as to frameless glasses.

Having thus described my invention, I claim as new and desire to secure by Letters Patent—

1. In eyeglasses, the combination, with the lenses and connecting-spring, of lever $e$, hung upon the spring and connected to one lens, substantially as and for the purposes set forth.

2. In eyeglasses, the fulcrum-piece $f$, connected to the bow-spring $c$, and the spring $e$, connected to piece $f$, and one lens, substantially as and for the purposes specified.

ROBERT KABUS.

Witnesses:
 GEO. D. WALKER,
 C. SEDGWICK.